United States Patent Office 3,334,078
Patented Aug. 1, 1967

3,334,078
PROCESS FOR THE CHLORINATION OF
POLYVINYL CHLORIDE
George Gateff, Lakewood, Ohio, assignor to The
B. F. Goodrich Company, New York, N.Y., a
corporation of New York
No Drawing. Filed Sept. 21, 1964, Ser. No. 398,036
20 Claims. (Cl. 260—92.8)

The present invention relates generally to an improvement in methods for the chlorination of polyvinyl chloride. More specifically, this invention relates to an improvement in the method of chlorinating particulate polyvinyl chloride resin in suspension in an aqueous medium containing an organic swelling agent for the PVC, which improvement comprises conducting the chlorination in the presence of colloidal silica or a colloidal silicate.

A process for the chlorination of polyvinyl chloride resin is described in U.S. Patent No. 2,996,489, which comprises preparing a suspension of finely divided PVC particles in a major proportion of a liquid aqueous medium, said suspension containing about 5 to 25% by volume of a chlorohydrocarbon which functions as a swelling agent for the PVC resin; saturating the liquid reaction medium with chlorine gas at a temperature no greater than about 65° C.– photo-illuminating said suspension, while maintaining the aforesaid conditions, to induce the chlorination reaction between the dissolved chlorine and the suspended PVC; passing more chlorine gas into said suspension so that there is always present an excess of dissolved chlorine; and terminating the chlorination when the desired amount of chlorine has been reacted with the PVC by extinguishing the photo-illumination. Application for U.S. patent Ser. No. 199,639, filed June 4, 1962, by George Gateff and Harold H. Bowerman, and now abandoned, describes means for increasing the chlorination rate in the practice of the aforedescribed process wherein a catalytic amount of a free-radical-producing agent is added to the suspension of PVC, for example, azo compounds, peroxy compounds, peroxides, nitroso compounds, "redox catalysts" and the like. Application for U.S. patent Ser. No. 184,535, filed April 2, 1962 by George Gateff and Harold H. Bowerman now Patent No. 3,167,535, also describes a method for increasing the reaction rate of the chlorination process disclosed by the aforesaid U.S. Patent No. 2,996,489, which entails adding a catalytic amount of reducing agent to the suspension, for example, reducing sugars, aldehydes, alkali metal sulfides, metabisulfites, bisulfites and hydrosulfites, and compounds having the formula

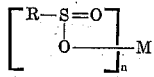

wherein R is a hydrocabron group having one to 8 carbon atoms, $n$ is an integer of 1 to 2 and M is a metal. Another method for the chlorination of PVC resin in a manner similar to that of U.S. Patent No. 2,996,489 is disclosed in U.S. Patent No. 3,100,762, wherein the difference resides in conducting the chlorination at a temperature of from 60 to 100° C. and at a pressure of 20 to 80 p.s.i.g. in the absence of photo-illumination. The substitution of the heat and pressure for the photo-illumination results in a faster reaction rate, while oddly enough, it is noted that applying heat and pressure together with illumination gives an inferior chlorinated product.

A disadvantage of the foregoing chlorination processes is that the slurry becomes thick and viscous as the chlorination progresses and the swollen resin particles tend to agglomerate and clump together; both of these factors lower the reaction rate and product quality.

After completion of the chlorination process described in the aforesaid specifications, the chlorinated polyvinyl chloride resin is recovered in the following manner. The agitation of the suspension in the reaction vessel is terminated and after a settling period of from about ten minutes to two hours, the suspension will have separated into substantially two phases: the acidic aqueous layer and the solvent swollen resin particles floating on top of the aqueous layer. Unfortunately, about 2 to 5% of the resin does not float to the top and remains suspended in the aqueous medium. The aqueous layer is then drained off and it is during this operation that the "unfloated" resin therein causes plugged lines and other difficulties; ultimately it is discarded and this product loss adds to the expenses of the process. The chlorinated resin is re-slurried in water containing a water-soluble base in an amount sufficient to neutralize the residual hydrochloric acid in the solvent-swollen resin particles. Examples of such bases are the sodium, potassium and ammonium hydroxides, carbonates, phosphates and the like. The neutralization step requires less base if prior thereto the resin is given one or more water washes and subsequent separations from the wash water.

The chlorohydrocarbon swelling agent is then stripped from the neutralized resin suspension and recovered as a wet overhead distillate. During the stripping operation, the neutralized slurry has a tendency to foam at the surface. The foaming is very pronounced at temperatures greater than 80° C., which is unfortunate as stripping temperatures of around 100° C. are desirable for good solvent removal. The foaming often causes the distillate condenser and the vent lines leading thereto to be plugged by entrained resin.

The stripped suspension is next filtered, and the resin, containing some residual electrolyte and about 3 to 9% of residual swelling agent, is recovered as the filter cake. The cake is washed with water to remove the residual electrolyte and the wet resin is dried in an air or vacuum oven, usually at 50 to 75° C. the drying operation may be facilitated by previously washing the cake with alcohol to displace the absorbed water with the more volatile liquid. The dried chlorinated PVC is recovered as a powder having essentially the same particle size distribution as the polyvinyl chloride feed.

The chlorinated polyvinyl chloride resin prepared according to the abovedescribed processes and the present invention has outstanding chemical resistance, durability, high softening point and a relatively high heat stability such that the stabilizer-free resin is not degraded when heated in the air for at least 10 minutes at 375 to 400° F. The chlorinated PVC has a density within the range of 1.43 to 1.65 gms./cc. at 25° C., i.e., the chlorine content thereof is 57.4 to 70.9 wt. percent (unchlorinated PVC contains 56.7% chlorine). The preferred resin has a density within the range of about 1.53 to 1.59 gms./cc. (64.3 to 67.7% chlorine) and a heat distortion temperature (ASTM Test Method D–648–56) of from about 95° C. to 125° C., that is, at least 20° C. higher than the heat distortion temperature of unchlorinated PVC resins. The most preferred post-chlorinated polyvinyl chloride resin has a density in the range of from about 1.55 to about 1.58 gms./cc. at 25° C. (65.5 to 67% chlorine) and a heat distortion temperature of at least 100° C. The chlorinated polyvinyl chloride resin is further characterized by being substantially insoluble in acetone, but very soluble in hot tetrahydrofuran. The resin is useful in the rigid vinyl field for the manufacture of pipe, ductwork, tanks, appliance parts, etc., especially where the products will handle or contact hot water and other hot, corrosive liquids. It has found particular utility in the production of hot water piping for industrial and domestic use. Ordinarily, a small amount of another resin or rubber, e.g., chlorinated polyethylene, styrene-acrylonitrile copolymer, chlorinated polyisobutylene, or the like is blended with the chlorinated PVC resin to improve its mechanical processibility and shock resistance. The pigments, lubricants and stabilizers well known in the vinyl art also can be incorporated therein.

It has now been discovered that the addition of a small amount of colloidal silica or colloidal mineral silicates or mixtures thereof to the suspension of PVC resin in the aqueous medium containing the chlorohydrocarbon swelling agent prior to the chlorination steps, such steps being described in the aforementioned disclosures, results in unexpected process improvements and a higher quality product. Briefly stated, the major improvements in and advantages of the present invention are: (a) there is a reduction in the viscosity of the reaction suspension resulting in improved agitation and reaction efficiency and permitting an increase in the amount of PVC charged in a run; (b) the resin particles do not agglomerate during chlorination; (c) after completion of the reaction and agitation is stopped, the swollen, chlorinated resin particles sink to the bottom of the reaction vessel instead of floating on top of the aqueous medium; (d) the resin particles do not agglomerate and there is no foaming during the stripping of the swelling agent; as a result, higher stripping temperatures can be used; (e) the chlorinated resin is relatively more heat stable and has better processibility.

According to the present invention, polyvinyl chloride resin is chlorinated as an agitated suspension of particles which are swollen by a chlorohydrocarbon solvent, in a major proportion of aqueous medium saturated with chlorine gas and containing in admixture a minor amount of colloidal silica or silicate, i.e., from about 0.2 part to about 5 parts of siliceous material per 100 parts by weight of PVC. By "aqueous medium" is meant either water, which is preferred, or dilute aqueous solutions of hydrochloric acid. The proportions of PVC resin and water may vary quite widely; for instance, as little as about 130 to 150 parts of water per 100 parts by weight of PVC are possible, while no real lower limit on solids concentration exists. It is, of course, economically desirable to have the solids concentration as high as possible. Accordingly, use of the siliceous material permits about a 40% to 45% increase in this variable without a corresponding increase in the viscosity of the suspension, said viscosity being an undesirable reaction condition.

The polyvinyl chloride resin starting material is a high molecular weight resin in particulate form which may have been prepared by emulsion or suspension techniques. The particle size thereof can range from about 0.5 micron to about 200 microns; the "macro-granular" type wherein essentially all of the particles are above about 10 microns and contain between about 5 to 50% by volume of pore space are preferred, although the substantially non-porous resins (i.e., having less than 5% of pore space) are suitable for use in the present chlorination process and give good results. The molecular weight of the PVC resin may be related to its specific viscosity which is determined herein by dissolving 0.24 gram of the resin in 50 ml. nitrobenzene while mildly heating and agitating on a solution roller. The solutions are then filtered into an appropriate Ubbelohde viscometer, previously calibrated for the pure solvent. The flow times in seconds for the solutions are determined at four different dilutions to obtain flow data at a number of concentrations. A portion of the original filtered solution is dried to constant weight at 130° C. to obtain a true concentration value. The ratio of the flow time of the solution to the flow time of the pure solvent is a value known as the "reduced viscosity." When the number (1) is subtracted from "reduced viscosity," one obtains the value known as the "specific viscosity." The PVC starting material in the process of this invention has a high molecular weight such that it possesses a specific viscosity of at least 0.20. Although the preferred polyvinyl chloride resin for the chlorination is the homopolymer of vinyl chloride, the process is adapted to the chlorination of copolymers of vinyl chloride with other monoolefinic monomers such as vinyl acetate, vinylidene chloride, acrylic and methacrylic acid esters, maleic acid esters, fumaric acid esters, ethylene, propylene and others, in which the polymerized vinyl chloride component of the copolymer is at least 70% by weight.

The point at which the colloidal siliceous material is added to the aqueous medium in preparing the suspension for chlorination is critical. The siliceous material must be added after both the PVC resin and water have been charged into the reactor and preferably while the suspension is being agitated. If the siliceous material is added to the aqueous medium before the PVC resin, the chlorinated resin product and the aqueous medium will not subsequently separate into two distinct layers to permit their ready separation by decanting.

A chlorohydrocarbon, desirably a hydro-chloromethylene compound, is added to the PVC resin suspension to swell the particles and encourage more intimate contact of the chlorine with the polymer. By "hydro-chloromethylene" compound is meant a chlorinated hydrocarbon containing at least one chlorine atom, at least one hydrogen atom and only one carbon atom. Such materials include monochloromethane, dichloromethane and trichloromethane (chloroform), the latter being the most efficient swelling agent. The amount of swelling agent used is from about 15 to about 100 parts by weight of PVC; however, from about 25 to 40 parts per hundred give best results. The hydro-chloromethylenes are preferred over other chlorinated hydrocarbons because they react but slowly with chlorine and the final product of such reaction is carbon tetrachloride, an innocuous material easily removed from the final polymer, and, in addition, the chlorinated PVC product has greater heat stability. Chlorinated ethylene and ethane derivatives and other chlorinated higher alkyl hydrocarbons are readily converted to high-boiling poly-chloro derivatives very difficult to remove from the polymer.

In general, it is advantageous to introduce the gaseous chlorine into a substantially oygen-free suspension. This may be accomplished by merely purging the reactor with an inert gas such as nitrogen or hydrogen chloride, or applying a vacuum thereto and then "breaking" the vacuum with an inert gas.

The aqueous medium is saturated with chlorine gas before reaction is initiated and the excess of chlorine is maintained throughout the reaction period. Thorough agitation of the suspension is maintained during the reaction cycle. As previously mentioned, the reaction rate can be increased by adding catalytic amounts of a free-radical-producing substance or a reducing agent to the suspension.

In one illustrative embodiment of the process, the chlorination of the PVC is initiated by exposing the suspension to photo-illumination. Any form of actinic radiation is suitable; for example, ordinary incandescent lamps, mercury vapor or arc lamps, neon glow tubes, fluorescent tubes, carbon arcs and sodium vapor lamps may be employed. Ultra-violet light is the preferred source of illumination. In order to obtain a highly heat-stable chlorinated resin when the chlorination is stimulated by photo-illumination, the reaction temperature should be maintained below about 65° C. Temperatures as low as 0° C. can be employed, although temperatures of from about 30° C. to about 55° C. are preferred. The pressure in the reactor should not exceed about 10 p.s.i.g. when practicing this embodiment.

In another illustrative embodiment of the process, the chlorination of the PVC resin is carried out at higher temperatures, 60 to 100° C., and under pressures within the range of 20 to 80 p.s.i.g., and further in the substantial absence of photo-illumination.

In the absence of the colloidal siliceous material, it is observed that as the chlorination of the PVC resin progresses, there is a gradual increase in suspension viscosity. This thickening prevents efficient agitation which in turn has a detrimental effect on the reaction between the chlorine and resin. The viscosity effect becomes a greater handicap at high solids concentration. When the colloidal silicate or silica is used, the increase in viscosity of the suspension is negligible and a higher solids concentration in the suspension is therefore permitted. For instance, there can be used as little as about 130 parts of aqueous medium per 100 parts of resin in the presence of colloidal siliceous matter compared to a minimum of about 260 parts of aqueous medium per 100 parts of resin in the absence of the additive. Moreover, when colloidal siliceous material is used, there is no resin particle agglomeration and clumping together, which condition occurs when the siliceous additive is absent. As stated above, agglomeration is a hindrance to efficient reaction and leads to an inferior product.

The reaction is continued until the desired degree of chlorination is attained. Representative reaction periods are about 5.5 hours to produce a chlorinated polyvinyl chloride resin product containing 66.1% of chlorine (equivalent to a resin density of 1.56 gms./cc. at 25° C.); about 4 hours for a chlorine content of 64.5% (density of 1.535 gms./cc.); and about 7 hours for a chlorine content of 67.7% (density of 1.590 gms./cc.). The reaction is terminated by removing the source of photo-illumination when light has been used as a chlorination stimulator; or if heat and pressure have been used in lieu of light, cooling the suspension and reducing the pressure terminates reaction; and thereafter, in either case, immediately shutting off the chlorine gas feed.

After the reaction has been terminated and the reaction vessel has been vented to allow passage of most of the chlorine gas therefrom, the product recovery phase of the operation is started. The product recovery is normally carried out at ambient temperatures, that is, from about 60 to 120° F., except where indicated hereinbelow. Agitation is stopped and the suspension, after an adequate settling period, separates into two phases, the chloromethane-swollen resin sinking to the bottom of the acidic aqueous medium. The aqueous medium, which is substantially free of floating resin particles (generally less than 0.5% of the total resin is suspended), is decanted and discarded, most conveniently by siphoning. This separation may be accomplished in less than half the time required when the colloidal siliceous material has not been used in the chlorination. For example, a suspension containing the colloidal siliceous material usually will separate in less than about ten minutes, while a suspension not containing the additive will require at least 30 minutes to separate into two phases. The resin particles in the vessel may be reslurried one or more times in fresh water, which is separated as previously by decantation, in order to remove some of the HCl acid solution trapped therein; however, this intermediate washing step is not necessary.

Neutralization of the residual hydrochloric acid entrapped in the swollen resin particles is accomplished by treating the polymer with water containing a soluble basic material, for example, sodium, potassium or ammonium hydroxides, carbonates, bicarbonates, phosphates and others. The suspension is, of course, agitated during the neutralization. The amount of treatment water may range from about 75 to 500 parts by weight per 100 parts by weight of resin and it will contain in solution a sufficient amount of base to effectively neutralize residual HCl and provide an essentially neutral pH (6.0 to 8.0). In general, from about 2 to 5 parts of base per 100 parts of resin are required, but this amount is approximately 30 to 60% less than when the chlorination has been carried out in the absence of the colloidal additive. This savings is due to a more efficient prior separation of the aqueous reaction medium from the chlorinated polymer and also less entrapped HCl solution in the resin which has been drained of said aqueous medium.

The hydro-chloromethylene compound, which is still present as a swelling agent for the resin, is next recovered by evaporation from the agitated, neutralized suspension. Having used the siliceous modifier during chlorination is advantageous during this solvent stripping as the resin particles do not agglomerate and there is no foaming, permitting a more efficient stripping and higher distillation temperatures and therefore providing a better solvent recovery without an attendant detrimental effect on the resin's quality. For instance, without colloidal siliceous matter, suspension temperatures during stripping generally are from 75 to 90° C., and solvent recoveries average about 50%. The present invention permits stripping temperatures as high as about 100° C. and solvent recovery is increased to about 75–80%. The stripping operation takes from about 1 to 4 hours. The overhead distillate is composed of water and the hydro-chloromethylene which is saved for recycling.

The neutralized aqueous suspension of resin is cooled, and upon standing, separates into the inverse phases whereby the substantially solvent-free resin sinks to the bottom. The bulk of the aqueous medium is decanted and the thick resin slurry is filtered. The filter cake is washed with fresh water to remove residual salts and electrolyte, about 100 to 300 parts of wash water per 100 parts of resin being adequate. If desired, residual water in the cake may be displaced by an alcohol wash before the resin is dried, as described earlier in this specification.

According to this invention, a small amount of colloidal silica or a colloidal inorganic silicate or mixtures thereof is added to the aqueous suspension of the PVC particles prior to the chlorination. "Colloidal silica" or a "silica sol" (the terms are often used interchangeably) can be defined as a "dispersion of silica in a liquid medium in which the particle size of the silica is within the colloidal range." Water is ordinarily the liquid medium in which the colloidal siliceous matter (silica or silicates) embodied herein is contained, however, the colloids may be utilized in other substantially inert liquid media such as chloroform, carbon tetrachloride, tetrachloroethane and other chlorinatedhydrocarbons. The colloidal particles of silica in a water sol will not necessarily be present as anhydrous silicon dioxide but may be in a hydrated form associated with various proportions of water. Therefore, partially dehydrated silicic acid would come within the term "silica" as used herein.

Although the dimensions of the discrete colloidal particles of silica may be within the range of about 0.001 micron to about 1 micron in diameter, it is preferred to use colloidal silica in which the particles are not larger than about 0.2 micron and it is most preferred that the average particle diameter be in the range of from about 0.005 to about 0.03 micron. The concentration of $SiO_2$ in the sol may vary from as little as about 1 percent up to about 35 percent depending on its method of preparation. Sols of low $SiO_2$ content may be concentrated by evaporation. Colloidal silicas are well known materials and are used widely in industry for various purposes. Colloidal silicas and methods for their preparation are described in detail in the treatise, "The Colloid Chemistry of Silica and Silicates," by Ralph K. Iler, Cornell University Press, Ithaca, N.Y. (1955), particularly in Chapter V, pp. 87 et seq. Many commercial silica sols are readily available, for example, under the trademarks "Ludox" (E. I. duPont de Nemours and Co.), "Syton" (Monsanto Company), "Nalcoag" (Nalco Chemical Company), "Cabosil" (Cabot Corporation) and others. Silica sols may contain a small amount of alkali as a stabilizer, e.g., from about 0.1 to about 1% based on $SiO_2$. The alkali stabilizer does not interfere with the effectiveness of the colloidal silica as an aid in the chlorination process of this invention.

The colloidal "silicates" embodied herein can be defined as a dispersion of particles of an insoluble inorganic silicate, i.e., either the silicate salt of a polyvalent metal or a natural mineral silicate, in colloidal dimensions, ordinarily in aqueous medium but which may be used in other substantially inert liquid media such as chlorinated hydrocarbons. The colloidal polyvalent metal silicates can be prepared synthetically by the well-known method of reacting a soluble polyvalent metal salt with a solution of a soluble alkali metal silicate, such as sodium silicate, thereby precipitating the insoluble metal silicate. In such a way are prepared colloidal silicates of aluminum, copper, zinc, manganese, cadmium, lead, nickel, silver, magnesium, calcium and the like. Such colloidal silicates are described in the aforementioned treatise by Iler in Chapter VII, pp. 181 et. seq. The preferred colloidal silicates, due to their ready availability and inexpensiveness, are the sols of the aforementioned natural mineral or clay silicates. They also are described in Chapter VII of the treatise by Iler, while a more detailed description of the natural mineral silicates is found in Volume 4 of the "Encyclopedia of Chemical Technology" by Kirk and Othmer, Interscience Encyclopedia Inc., New York (1949), at pp. 26 et. seq., under the topic heading "Clays (Survey)." Examples of the mineral silicates are the kaolin minerals, i.e., kaolinite, dickite and nacrite (all $Al_2O_3 \cdot SiO_2 \cdot 2H_2O$), anauxite (approaching

$Al_2O_3 \cdot 3SiO_2 \cdot 2H_2O$)

and halloysiteendallite ($Al_2O_3 \cdot 2SiO_2 \cdot 2H_2O$ and

$Al_2O_3 \cdot 2SiO_2 \cdot 4H_2O$ respectively); and the montmorillonite group of minerals, i.e., montmorillonite, beidillite, montronite and the others set forth, together with typical formulas, on page 28 of the aforesaid reference in the "Encyclopedia of Chemical Technology." The montmorillonite group of minerals are the principal constituents of the group of clays known as bentonites, which, in the colloidal form, give very good results in the process embodied herein.

The operable size range of the colloidal particles of the inorganic silicates embodied herein is substantially the same as previously described for the colloidal silica, however, the particles of the mineral or clay silicates are generally not spherical but are in the shapes of thin sheets, platelets, fibers, rods, ribbons and other odd configurations, so that any specific designation of the particular dimension used in measuring particle size of these colloidal particles is necessarily somewhat arbitrary.

The amount of colloidal siliceous material employed in the chlorination suspension is at least about 0.2 part per 100 parts of PVC resin; the preferred amount is from about 0.5 to 1 part per hundred. Generally, no more than about 5 parts per hundred should be used because an excess amount of the colloidal material will not give any significant process improvement over the small amounts recommended and will unnecessarily contaminate the chlorinated polyvinyl chloride resin product. The aforesaid amounts of siliceous additive are based on the dry weight of the siliceous material. Although the colloidal siliceous material usually is charged to the PVC resin slurry as a suspension in a liquid medium, the dry, powdery form gives equally good results.

The mechanism by which the colloidal silica or silicate provides the process improvements as herein specified is not known, except to say that it may provide unique dispersing or wetting agent or protective colloid effects in the vinyl resin particle suspension. However, tests have shown that commonly used surface active agents do not provide the improvements in the present process that result with the colloidal silica(ate). For example, the anionic surfactants such as the fatty acid soaps (e.g., sodium and potassium salts of fatty acids, rosin acids, and of disproportionated or dehydrogenated rosin acids), the alkyl sulfonates and the like, and the nonionic surfactants such as the polyglycol fatty acid esters, the polyoxypropylene and polyoxyethylene fatty alcohol ethers and the like are not only ineffectual as processing aids but also reduce the product's heat stability. Cationic surfactants, which are in general amine or ammonium salts, inhibit the chlorination. Polyvinyl alcohol, a typical suspending agent, causes product discoloration and poor heat stability. Polyvinyl alcohol also reacts with chlorine to form undesirable by-products. Gelatin, another common suspending agent, almost completely inhibits the chlorination.

The examples that follow are set forth to clarify the invention and should not be regarded as limiting the scope thereof in any way.

Example 1

Six laboratory-scale chlorinations were carried out using the following recipes. Runs 1 and 2 were controls.

| Run No. | Polyvinyl chloride resin,[1] grams | Water, grams | Chloroform, grams | Colloidal silica (ate) additive, (parts per 100 parts of PVC on dry weight basis) | Chlorination time, hours |
|---|---|---|---|---|---|
| 1 | 800 | 2,500 | 250 | None | 3 |
| 2 | 800 | 2,500 | 250 | ____do____ | 2 |
| 3 | 800 | 2,500 | 250 | 1 phr. aluminum silicate[2] | 3 |
| 4 | 800 | 2,500 | 250 | 0.5 phr. "Ludox HS"[3] | 2 |
| 4 | 800 | 2,500 | 250 | 1 phr. "Ludox HS"[3] | 2 |
| 6 | 800 | 2,500 | 250 | 0.5 phr. silica[4] | 2 |

[1] "Geon 110 x 154" (product of B. F. Goodrich Chemical Co.). A highly porous (about 30— pore space by volume) macro-granular vinyl chloride polymer with a specific viscosity of 0.54 and having a particle size distribution such that 100% is retained on a 200 mesh screen and the preponderance of particles are greater than 25 microns.
[2] As $3Al_2O_3 \cdot 4SiO_2 \cdot H_2O$.
[3] "Ludox HS" colloidal silica (E. I. duPont de Nemours & Co.). An aqueous sol containing 30.1% silica as $SiO_2$, 0.31% $Na_2O$ (titratable alkali) as stabilizer, approximate particle diameter 0.014–0.015 micron.
[4] Dry, powdery amorphous $SiO_2$ having an average particle diameter of 0.010 to 0.015 micron.

The operating procedure was as follows. The PVC resin was slurried with the water, the colloidal silica or silicate was added thereto (in runs 3–6) with continuous mixing and finally the chloroform was added. The suspension was heated to 40° C. and purged with nitrogen. The agitated, substantially oxygen-free suspension was saturated with chlorine gas and the reaction initiated by actinic activation using an ultra-violet light source (100 watt G.E. mercury bulb). The gaseous chlorine feed rate was maintained during the reaction to insure saturation and an excess of chlorine. The reaction temperature was maintained at about 50° C.

As the chlorinations progressed, the suspensions in the control runs (1 and 2) became quite thick and viscous, while those of the other runs remained very fluid. There was considerable resin particle agglomeration in the suspensions of the control runs and insignificant agglomeration in the others. The chlorinations were terminated by extinguishing the light, shutting off the chlorine feed and purging the unreacted chlorine with a nitrogen sparge. The stirring was stopped and the suspension separated into two layers. In runs 3 through 6 the chlorinated polyvinyl chloride resin sunk to the bottom of the aqueous medium forming two distinct layers. In control runs 1 and 2, approximately 90 to 95% of the resin particles floated on the surface of the aqueous medium while 5 to 10% remained in the lower portion of the reactor; the separation of the layers was comparatively unsatisfactory.

The chloroform-swollen resin was separated from the aqueous medium on a Buchner filter, the filter cake washed with water and then reslurried in fresh water. Residual hydrochloric acid in the resin was neutralized by adding dilute sodium carbonate solution to the slurry until its pH was 7.5. The neutralized suspension was filtered and the filter cake washed with methanol to displace the chloroform. The particulate chlorinated PVC was dried in a 40° C. air-circulated oven. The degree of chlorination of the product was measured.

| Chlorinated PVC from Run No. | Density, gms./cc. at 25° C. | Chlorine Content, Percent |
|---|---|---|
| 1 | 1.584 | 67.3 |
| 2 | 1.565 | 66.3 |
| 3 | 1.585 | 67.3 |
| 4 | 1.568 | 66.4 |
| 5 | 1.566 | 66.3 |
| 6 | 1.562 | 66.2 |

Samples of the chlorinated PVC from run 1 and run 3 (as seen above the chlorine contents of these resins were essentially equal) were each compounded with 0.75 part of a lubricant (calcium stearate) and 3 parts of a stabilizer (barium-cadmium mixed fatty acid salts) per 100 parts of the resin. The mixtures were roll-milled at 395° F. for five minutes into sheets for testing of the physical properties shown below.

| Chlorinated PVC From Run No. | Heat Distortion Temperature, °F. (ASTM D648-56) | Tensile Strength, p.s.i. (ASTM D638-60T) | Heat Stability at 400° F., minutes to turn black |
|---|---|---|---|
| 1 | 236 | 9,600 | 45 |
| 3 | 237 | 9,600 | 50 |

The results show that in addition to the process improvements obtained by incorporating the colloidal siliceous material into the reaction medium before chlorinating the polyvinyl chloride, there is a measurable increase in the quality of the product with respect to its thermal properties.

*Example II*

Two chlorinations were carried out in a 200 gallon, glass-lined reactor using the following recipes.

| | Run 7 (control), lbs. | Run 8, lbs. |
|---|---|---|
| PVC resin, "Geon 110 x 154" | 600 | 600 |
| Water | 1,200 | 1,200 |
| "Ludox HS" colloidal silica | None | ¹3.6 |
| Chloroform | 150 | 180 |

¹ Dry weight.

The steps preparative to chlorination and the chlorination procedure were substantially the same as described in Example I. The reactor pressure was 6 p.s.i.g. and temperature 48° to 50° C. Reaction times were 7.25 hours and 6.83 hours, respectively. As the chlorination proceeded, the suspension in run 7 became thick and agglomerated while that of run 8 remained fluid. Reaction was terminated by extinguishing the ultraviolet light, stopping the chlorine feed and purging with nitrogen. When the agitation was stopped, most of the resin particles in run 7 floated on top of the acidic aqueous medium but some sunk to the bottom of the reactor. Essentially all the resin in run 8 dropped to the bottom of the aqueous medium. The aqueous media were separated from the resin by draining and by decantation (syphoning), respectively, the separations requiring 2 hours for run 7 and 45 minutes for run 8. The settled resin in run 7 complicated the draining operation and, furthermore, about 25 lbs. of product were lost to the discarded aqueous medium. There was no noticeable loss of resin in the decantation operation associated with run 8. The particulate resin was reslurried in fresh water for 15 minutes to remove some of the residual acid. After settling for 30 minutes, the aqueous media and the resin layered out as described above. The decantation operation for separating the water in run 8 was much faster than the draining operation of run 7.

The resin particles again were reslurried in water and neutralized with a dilute solution of $Na_2CO_3$ to a pH of 7.5. Run 7 required 30 pounds of $Na_2CO_3$ compared to only 18 pounds of this neutralizing material for run 8. The chloroform swelling agent was recovered from the suspension by distillation. In run 7 when the stripping temperature reached 75° C., there was excessive particle agglomeration and foaming. When the temperature reached 90° C. the foam started to travel up the reactor vent line to the condenser and the temperature had to be kept below 95° C. Chloroform recovery in run 7 was poor, only about 55%. In run 8 the stripping temperature was taken to 100° C. without any particle agglomeration or foaming of the suspension. Chloroform recovery was about 75%. The suspensions were filtered and the filter cakes dried at 60–65° C. in an air-circulated oven. The chlorinated PVC from each run had a density of 1.57 gms./cc. at 25° C. (chlorine content of 66.6%). Samples were compounded with lubricant and stabilizer and sheets prepared for physical testing as in Example I with these results.

| Chlorinated PVC from Run No. | Heat Distortion Temperature, °C. | Tensile Strength, p.s.i. | Heat Stability at 400° F., minutes to turn black |
|---|---|---|---|
| 7 | 110 | 9,400 | 40 |
| 8 | 115 | 9,600 | 45 |

The data show that in addition to the advantages of shorter chlorination periods and easier and faster product recovery steps achieved by the use of the colloidal silica additive, the chlorinated polyvinyl chloride product had generally better physical properties than that produced in the absence of colloidal silica.

I claim:

1. In the method for chlorinating particulate polyvinyl chloride resin composed of particles within the range of from about 0.5 micron to about 200 microns comprising the steps of preparing a suspension of 100 parts by weight of the polyvinyl chloride in at least about 130 parts by weight of liquid aqueous medium, said suspension containing from about 15 to about 100 parts by weight of a hydro-chloromethylene compound to serve as a swelling agent for the suspended polyvinyl chloride resin, substantially saturating the liquid aqueous medium of the suspension with gaseous chlorine, inducing the chlorination reaction between the chlorine and the polyvinyl chloride in said suspension, maintaining an excess of dissolved chlorine in said suspension over that momentarily reacting with the suspended resin, terminating the reaction when the desired amount of chlorination of the resin has been achieved, separating the hydro-chloro-methylene-swollen chlorinated polyvinyl chloride resin product from the aqueous medium, neutralizing said product, and separating the hydro-chloromethylene from said product; the improvement which comprises admixing with said suspension of polyvinyl chloride resin in liquid aqueous medium prior to the chlorination thereof from about 0.2 part to about 5 parts of colloidal siliceous material selected from the group consisting of colloidal silica, colloidal polyvalent inorganic silicates.

2. The method of claim 1 wherein there is used from about 0.5 to about 1 part of colloidal siliceous material.

3. The method of claim 1 wherein the colloidal siliceous material is colloidal silica having an average particle diameter in the range of from about 0.005 to about 0.03 micron.

4. The method according to claim 3 wherein there is used from about 0.5 to about 1 part of colloidal silica.

5. The method of claim 1 wherein the colloidal siliceous material is colloidal aluminum silicate.

6. In the method for chlorinating particulate polyvinyl chloride resin composed of particles within the range of from about 0.5 micron to about 200 microns comprising the steps of preparing a suspension of 100 parts by weight of the polyvinyl chloride in at least about 130 parts by weight of liquid aqueous medium, said suspension containing from about 15 to about 100 parts by weight of a hydro-chloromethylene compound to serve as a swelling agent for the suspended polyvinyl chloride resin, substantially saturating the liquid aqueous medium of the suspension with gaseous chlorine, inducing the chlorination reaction between the chlorine and the polyvinyl chloride in said suspension by photo-illumination, maintaining the reaction at a temperature no greater than about 65° C. and maintaining an excess of dissolved chlorine in said suspension over that momentarily reacting with the suspended resin, terminating the reaction when the desired amount of chlorination of the resin has been achieved by extinguishing the photo-illumination, separating the hydro-chloromethylene-swollen chlorinated polyvinyl chloride resin product from the aqueous medium, neutralizing said product, and separating the hydro-chloromethylene from said product; the improvement which comprises admixing with said suspension of polyvinyl chloride resin in liquid aqueous medium prior to the chlorination thereof from about 0.2 part to about 5 parts of colloidal siliceous material selected from the group consisting of colloidal silica, colloidal polyvalent inorganic silicates.

7. The method of claim 6 wherein there is used from about 0.5 to about 1 part of colloidal siliceous material.

8. The method of claim 6 wherein the colloidal siliceous material is colloidal silica having an average particle diameter in the range of from about 0.005 to about 0.03 micron.

9. The method according to claim 8 wherein there is used from about 0.5 to about 1 part of colloidal silica.

10. The method of claim 6 wherein the colloidal siliceous material is colloidal aluminum silicate.

11. In the method for chlorinating particulate polyvinyl chloride resin composed of particles within the range of from about 0.5 micron to about 200 microns comprising the steps of preparing a suspension of 100 parts by weight of the polyvinyl chloride in at least about 130 parts by weight of liquid aqueous medium, said suspension containing from about 15 to about 100 parts by weight of a hydro-chloromethylene compound to serve as a swelling agent for the suspended polyvinyl chloride resin, substantially saturating the liquid aqueous medium of the suspension with gaseous chlorine and inducing the chlorination reaction between the chlorine and the polyvinyl chloride in said suspension by maintaining the reaction temperature at from 60° C. to 100° C. and the pressure at from 20 to 80 p.s.i.g., terminating the reaction when the desired amount of chlorination of the resin has been achieved, separating the hydro-chloromethylene - swollen chlorinated polyvinyl chloride resin product from the aqueous medium, neutralizing said product, and separating the hydro-chloromethylene from said product; the improvement which comprises admixing with said suspension of polyvinyl chloride resin in liquid aqueous medium prior to the chlorination thereof from about 0.2 part to about 5 parts of colloidal siliceous material selected from the group consisting of colloidal silica, colloidal polyvalent inorganic silicates.

12. The method of claim 11 wherein there is used from about 0.5 to about 1 part of colloidal siliceous material.

13. The method of claim 11 wherein the collodial siliceous material is colloidal silica having an average particle diameter in the range of from about 0.005 to about 0.03 micron.

14. The method according to claim 13 wherein there is used from about 0.5 to about 1 part of colloidal silica.

15. The method of claim 11 wherein the colloidal siliceous material is colloidal aluminum silicate.

16. In the method for chlorinating particulate polyvinyl chloride resin composed of particles within the range of from about 0.5 micron to about 200 microns comprising the steps of preparing a suspension of 100 parts by weight of the polyvinyl chloride in at least about 130 parts by weight of liquid aqueous medium, said suspension containing from about 25 to about 40 parts by weight of chloroform to serve as a swelling agent for the suspended polyvinyl chloride resin, substantially saturating the liquid aqueous medium of the suspension with gaseous chlorine, inducing the chlorination reaction between the chlorine and the polyvinyl chloride in said suspension by photo-illumination, maintaining the reaction at from about 30° C. to 55° C. and maintaining an excess of dissolved chlorine in said suspension over that momentarily reacting with the suspended resin, terminating the reaction when the desired amount of chlorination of the resin has been achieved by extinguishing the photo-illumination, separating the chloroform-swollen chlorinated polyvinyl chloride resin product from the aqueous medium, neutralizing said product, and separating the chloroform from said product; the improvement which comprises admixing with said suspension of polyvinyl chloride resin in liquid aqueous medium prior to the chlorination thereof from about 0.2 part to about 5 parts of colloidal siliceous material selected from the group consisting of colloidal silica, colloidal polyvalent inorganic silicates.

17. The method of claim 16 wherein there is used from about 0.5 to about 1 part of colloidal siliceous material.

18. The method of claim 16 wherein the colloidal siliceous material is colloidal silica having an average particle diameter in the range of from about 0.005 to about 0.03 micron.

19. The method according to claim 18 wherein there is used from about 0.5 to about 1 part of colloidal silica.

20. The method of claim 16 wherein the colloidal siliceous material is colloidal aluminum silicate.

No references cited.

JOSEPH L. SCHOFER, *Primary Examiner.*

J. A. DONAHUE, JR., *Assistant Examiner.*